United States Patent
Lee et al.

(10) Patent No.: US 9,628,200 B2
(45) Date of Patent: Apr. 18, 2017

(54) SYSTEM AND APPARATUS FOR PROVIDING BEAMFORMING VECTOR FOR WIRELESS NETWORK SYSTEMS, METHOD, PROGRAM AND RECORDING MEDIA USING THEREOF

(71) Applicant: Seoul National University R&DB Foundation, Seoul (KR)

(72) Inventors: Kwang Bok Lee, Seoul (KR); Doo Hee Kim, Suwon-si (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/074,590

(22) Filed: Mar. 18, 2016

(65) Prior Publication Data
US 2016/0285523 A1     Sep. 29, 2016

(30) Foreign Application Priority Data

Mar. 19, 2015 (KR) .......................... 10-2015-0038151

(51) Int. Cl.
| | | |
|---|---|---|
| *H04B 7/04* | (2017.01) | |
| *H04B 15/02* | (2006.01) | |
| *H04B 7/024* | (2017.01) | |

(52) U.S. Cl.
CPC ............. *H04B 15/02* (2013.01); *H04B 7/024* (2013.01)

(58) Field of Classification Search
CPC ................................. H04B 7/043; H04B 15/02
See application file for complete search history.

(56) References Cited

U.S. PATENT DOCUMENTS

| | | | |
|---|---|---|---|
| 9,100,971 B2* | 8/2015 | Lee | ............... H04W 72/082 |
| 2006/0189280 A1 | 8/2006 | Goldberg | |
| 2015/0358953 A1* | 12/2015 | Lee | ..................... H04B 7/024 370/329 |

FOREIGN PATENT DOCUMENTS

KR        10-1488771 B1      2/2015

OTHER PUBLICATIONS

Park et al.,New Beamforming Techniques :Based on Virtual SINR Maximization for Coordiinated Multi-Cell Transmission, Mar. 2012, IEEE Transactions on Wireless Communications, vol. 11, No. 3. pp. 1034-1044.*

(Continued)

*Primary Examiner* — Chi H Pham
*Assistant Examiner* — Shailendra Kumar
(74) *Attorney, Agent, or Firm* — Novick, Kim & Lee, PLLC; Sang Ho Lee (57) ABSTRACT

The present invention relates to a system and an apparatus for providing beamforming vector for a very high density cellular networks, a method, a program and a recording medium using thereof a transmitter that comprises a plurality of cell and an apparatus for providing beamforming vector, wherein the apparatus for providing beamforming vector controls a signal transmission of each of the plurality of cell; the apparatus for providing beamforming vector that defines a probability (ψ) for an interference cancelation, expresses a network-wide sum rate as a function of ψ, calculates a value of ψ that maximizes the network-wide sum rate and calculates a range of a magnitude of an interference channel to be canceled corresponding the value of ψ; and a receiver that receives a signal from the transmitter and comprises at least one mobile station and nullifies the range of the magnitude of the interference channel to be canceled.

4 Claims, 5 Drawing Sheets

(56) References Cited

OTHER PUBLICATIONS

S. Catreux et al., "Simulation Results for an Interference-Limited Multiple-Input Multiple-Output Cellular System", IEEE Communications Letters, pp. 334-336, vol. 4, No. 11, Nov. 2000.

"3rd Generation Partnership Project; Technical Specification Group Radio Access Network; Coordinated multi-point operation for LTE physical layer aspects (Release 11)", 3GPP TR 36.819, pp. 1-69, V11.1.0, 2011-2012.

Mirette Sadek et al., "A Leakage-Based Precoding Scheme for Downlink Multi-User MIMO Channels", IEEE Transactions on Wireless Communications, pp. 1711-1721, vol. 6, No. 5, May 2007.

Byong Ok Lee et al., "A Novel Uplink MIMO Transmission Scheme in a Multicell Environment", IEEE Transactions on Wireless Communications, pp. 4981-4987, vol. 8, No. 10, Oct. 2009.

Eduard A. Jorswieck et al., "Complete Characterization of the Pareto Boundary for the MISO Interference Channel", IEEE Transactions on Signal Processing, pp. 5292-5296, vol. 56, No. 10, Oct. 2008.

Johannes Lindblom et al., "Selfishness and Altruism on the MISO Interference Channel: The Case of Partial Transmitter CSI", IEEE Communications Letters, pp. 667-669, vol. 13, No. 9, Sep. 2009.

Zuleita K. M. Ho et al., "Balancing Egoism and Altruism on Interference Channel: The MIMO Case", IEEE ICC 2010 proceedings, 2010.

Johannes Lindblom et al., "Cooperative Beamforming for the MISO Interference Channel", IEEE, 2010 European Wireless Conference, pp. 631-638, 2010.

Seok-Hwan Park et al., "New Beamforming Techniques Based on Virtual SINR Maximization for Coordinated Multi-Cell Transmission", IEEE Transactions on Wireless Communications, pp. 1034-1044, vol. 11, No. 3, Mar. 2012.

Nihar Jindal et al., "Rethinking MIMO for Wireless Networks: Linear Throughput Increases with Multiple Receive Antennas", IEEE ICC 2009 Proceedings, 2009.

\* cited by examiner

SYSTEM AND APPARATUS FOR PROVIDING BEAMFORMING VECTOR FOR WIRELESS NETWORK SYSTEMS, METHOD, PROGRAM AND RECORDING MEDIA USING THEREOF

CROSS-REFERENCE TO RELATED APPLICATION

This application claims the benefit under 35 USC 119(a) of Korean Patent Application No. 10-2015-0038151 filed on Mar. 19, 2015, in the Korean Intellectual Property Office, the entire disclosure of which is incorporated herein by reference for all purposes.

BACKGROUND OF INVENTION

Technical Field

The present invention relates to a system and an apparatus for providing beamforming vectors for very high density cellular networks, and a corresponding method, a corresponding program and a corresponding recording medium. More specifically, a system, an apparatus, a method, a program and a recording media for providing beamforming vectors for wireless network systems that reduces complexity of the system by a one-shot, non-iterative, decision of beamforming vectors according to a predetermined decision metric called global selfishness is provided.

Background Art

Recently, due to unlimited data plans of telecommunication companies, traffic of mobile communication data has increased by an unprecedented rate. To meet this rapidly increasing traffic of mobile communication data, high-density cellular networks that have more and smaller cells are proposed, such as Femtocells. However, a gain of spatial reuse by using smaller cells fatally requires very high maintenance costs. As the network infrastructure is increasingly crowded with the addition of small cells, inter-cell interference (ICI) is getting worse, and the amount of information that requires computation is increasing in order to manage ICI is rapidly increasing. Therefore, a method for managing the ICI effectively while lowering the complexity is required.

More specifically, cooperative beamforming (BF) schemes using a multi-antenna system are used for a multiple access system in order to improve the performance of the system and increase a capacity. Typically, cooperative beamforming schemes refer to arranging a plurality of antennas at regular intervals, and transferring the signal to each antenna by applying weighting vector.

In cellular networks, ICI is one of the most dominating factors that determine the performance of cellular systems. The sum rate performance is significantly degraded by ICI, especially when a small number of frequency reuse factors are adopted in the network. Thus, there have been seamless efforts to efficiently reduce the ICI by introducing cooperative beamforming among the cells. A well-known coordinated multi-point (CoMP) technique is one example of this effort, which has been rigorously developed for commercial $3^{rd}$ generation partnership project long term evolution (3GPP-LTE) systems. The main hurdle for the network-wide sum rate maximization is its mathematical intractability. It is very difficult to determine the cooperative beamforming vectors that maximize the desired signal power of one cell while minimizing the generated interference to other cells, since they are all coupled in terms of the sum rate. Unfortunately, no closed-form solution is known for the problem. Instead, some alternative approaches have been proposed in the literature (non-patent documents 3~9) as described below.

Referring to the non-patent documents 3 and 4, a new matrix is defined as the ratio of the desired signal power and generated interference to neighboring cells and noise power (SGINR), and the cooperative beamforming vectors in each cell are individually determined to maximize it. The SGINR based cooperative beamforming considers both the maximization of the desired signal power and the minimization of the generated interference to neighbors, thus increasing the network-wide sum rate. For a two-cell case, it has been proved that the SGINR-based cooperative beamforming is equivalent to the optimal beamforming that maximizes the network-wide sum rate.

Zero forcing (ZF) beamforming can be used to obtain an optimal weight vector for each antenna. Zero forcing beamforming removes the interference signal by multiplying the inverse matrix of the channel in advance when transmitting the signals, so that no interference occurs to the other receivers that are not the target of the transmitted signals. Thus, zero forcing beamforming is regarded as altruistic beamforming. Alternately, maximal ratio transmission (MRT) is beamforming that focuses its power on the target receiver without considering interference to the other receivers. Therefore, maximal ratio transmission beamforming is regarded as egoistic beamforming.

Therefore, high transmission efficiency can be expected when using the egoistic beamforming, such as the maximum ratio transmission beamforming in the communication environment at the favorable channel condition, and when using the altruistic beamforming, such as zero-forcing beamforming in the communication environment in an inferior channel condition. However, the channel condition changes over time, so it is required to combine egoistic beamforming and altruistic beamforming properly in order to obtain the optimal transmission efficiency. Non-patent documents 5 to 8 suggest beamforming that is the proper linear combination of the ZF and MRT.

In non-patent document 5, it has been shown that a simple linear-type combination of egoistic beamforming and altruistic beamforming can achieve Pareto optimality in MISO (Multiple-Input Single-Output). Pareto optimality for a transmitter that is available for channel state information (CSI) partially in a MISO system has been disclosed in non-patent document 6. A MIMO system using a game-theoretic point of view has been disclosed in non-patent document 7. These non-patent documents achieve performance close to the optimal performance by using Bayesian games that allow each of the base station (BS) to operate semi-distributed. Non-patent document 8 proposed a beamforming scheme that uses a degree of the interference for a bargaining value, taking into account all instantaneous values and statistical values of the CSI. Non-patent document 9 proposed an inter-cell cooperative beamforming based on the virtual-SINR.

RELATED ART DOCUMENT

Patent Document (Patent Document 1) US 20060189280 A1, Pattern diversity to support a MIMO communications system and associated methods, Inter Digital Technology Corporation
(Patent Document 2) KR 10-1488771 B1, Beamforming device and method with channel distribution information and interference temperature level control for MISO interference channel, Korea Advanced Institute of Science and Technology Non-Patent Document (Non-Patent Document 1) S. Cartreux, P. F. Driessen, and L. J. Greenstein, "Simulation results for an interference-limited multiple-input multiple-output cellular system," IEEE Commun. Lett., vol. 4, no. 11, pp. 334-336, November 2000.
(Non-Patent Document 2) 3GPP, TR 36.819, v11.1.0 "Coordinated multi-point operation for LTE physical layer aspects(release 11)," December 2011.
(Non-Patent Document 3) M. Sadek, A. Tarighat, and A. H. Sayed, "A leakage-based precoding scheme for downlink multi-user MIMO channels," IEEE Trans. Wireless Commun., Vol. 6, no. 5, pp. 11711-1721, May 2007.
(Non-Patent Document 4) B. O. Lee, H. W. Je, O.-S. Shin, and K. B. Lee, "A novel uplink MIMO transmission scheme in a multicell environment." IEEE Trans. Wireless Commun., vol. 8, no. 10, pp. 4981-4987, October 2009.
(Non-Patent Document 5) E. A. Jorswieck, E. G. Larsson, and D. Danev, "Complete characterization of the Pareto boundary for the MISO interference channel," IEEE Trans. Signal Processing, vol. 56, no. 10, pp. 5292-5296, October 2008.
(Non-Patent Document 6) J. Lindblom, E. Karipidis, and E. G. Larsson, "Selfishness and altruism on the MISO interference channel: the case of partial transmit CSI," IEEE Commun. letters, vol. 13, no. 9, pp. 667-669, September 2009.
(Non-Patent Document 7) Z. K. M. Ho, and D. Gesbert, "Balancing egoism and altruism on interference channel: The MIMO case," in IEEE International conference on communications (ICC) 2010, Cape Town, South Africa, May 2010.
(Non-Patent Document 8) J. Lindblom, and E. Karipidis, "Cooperative beamforming for the MISO interference channel," IEEE European Wireless Conference (EW) 2010, Lucca, Italy, April 2010.
(Non-Patent Document 9) S. H. Park, H. Park, H. Kong, and I. Lee, "New beamforming techniques based on virtual SINR maximization for coordinated multi-cell transmission," IEEE Trans. Wireless Commun., vol. 11, no. 3, pp. 1034-1044, March 2012.
(Non-Patent Document 10) N. Jindal, J. G. Andrews, and S. Weber, "Rethinking MIMO for wireless networs: Linear throughput increase with multiple receive antennas," IEEE International Conference on Communications (ICC) 2009, Dresden, Germany, June 2009.

BRIEF SUMMARY OF THE INVENTION

Problems to be Solved by the Invention

However, the aforementioned inter-cell cooperative beamforming vector providing method (Non-patent Document 5 to 9) has a problem in that an iterative process is required to calculate the beamforming vector inter-cell cooperation. According to the conventional beamforming scheme, each BS (Base Station) needs to create a new beamforming vectors for changes in all channel conditions. Therefore, when the channel conditions change continuously, there is a tremendous complexity, according to the conventional method. After all, in practice, the most important factor is to reduce this complexity. It is necessary to provide a beamforming vector method to reduce this complexity.

Accordingly, the present invention is proposed in order to solve these problems. The purpose of the present invention is to provide an inter-cell cooperative beam-forming scheme, which is calculated as one-shot (iteration is not required) for optimized beamforming vectors.

Means for Solving the Problem

According to an aspect of the present invention, the network-wide sum rate is derived by following equation:

$$
\begin{aligned}
E[R_{sum}(\psi)] &= (1-\psi)^2 E[\log_2(1+\Gamma_1^{(0,0)})(1+\Gamma_2^{(0,0)})] + \\
&\quad \psi(1-\psi)E[\log_2(1+\Gamma_1^{(0,1)})(1+\Gamma_2^{(1,0)})] + \\
&\quad \psi(1-\psi)E[\log_2(1+\Gamma_1^{(1,0)})(1+\Gamma_2^{(0,1)})] + \\
&\quad \psi^2 E[\log_2(1+\Gamma_1^{(1,1)})(1+\Gamma_2^{(1,1)})] \leq \\
&\quad (1-\psi)^2 \log_2(E[1+\Gamma_1^{(0,0)}]E[1+\Gamma_2^{(0,0)}]) + \\
&\quad \psi(1-\psi)\log_2(E[1+\Gamma_1^{(0,1)}]E[1+\Gamma_2^{(1,0)}]) + \\
&\quad \psi(1-\psi)\log_2(E[1+\Gamma_1^{(1,0)}]E[1+\Gamma_2^{(0,1)}]) + \\
&\quad \psi^2 \log_2(E[1+\Gamma_1^{(1,1)}]E[1+\Gamma_2^{(1,1)}]) \equiv R_{sum}^U(\psi),
\end{aligned}
$$
[Equation]

where $E(\cdot)$ is a function for an expected value, $R_{sum}(\psi)$ si the network-wide sum rate, $R_{sum}^U(\psi)$ is an upper bound of an expected value of the network-wide sum rate and $\Gamma_i^{(m,l)}$ is SINR of the mobile station in an i-th cell where the i-th cell nullifies m generated interference links to neighboring cells and i-th cell received interference links of the mobile station in the i-th cell are nullified by the neighboring cells.

According to an aspect of the present invention, the value of w that maximizes the network-wide sum rate is derived by following equation:

(1) $A < 0$ [Equation]

$$\psi^* = \begin{pmatrix} 0 & \text{if} & \psi^D < 0 \\ \psi^D & \text{if} & 0 \leq \psi^D \leq 1 \\ 1 & \text{if} & 1 < \psi \end{pmatrix}$$

(2) $A > 0$ $$\psi^* = \begin{pmatrix} 0 & \text{if} & |\psi^D| \leq |\psi^D - 1| \\ 1 & \text{if} & |\psi^D| > |\psi^D - 1| \end{pmatrix}$$

where, $$\psi^D = -B/2A, \text{ s.t. } \left[\frac{\partial R_{sum}^U(\psi)}{\partial \psi}\right]_{\psi=\psi^D} = 0,$$

$$R_{sum}^U(\psi) \approx A\psi^2 + B\psi + C,$$

where $R_{sum}(\psi)$ is the network-wide sum rate, $R_{sum}^U(\psi)$ is an upper bound of an expected value of the network-wide sum rate, $\psi^*$ is at least one optimal value of probability $\psi$, $\psi^D$ is a point of at least one pole, A, B and C are coefficients determined by a power of the apparatus for providing the beamforming vector and a location of at least one receiver.

Effect of the Invention

As described above, there are the following effects according to the present invention.

With the exemplary embodiment of the present invention, the inter-cell cooperative beam-forming scheme is effective to maximize the average of the network-wide sum rate. Conventional methods proposed in the prior literature focused on the instantaneous maximization for the sum rate and iterative calculations. However, an embodiment of the invention focuses on maximizing the average of the sum rate of some or all of the overall network system.

In addition, according to an embodiment of the present invention, it is unnecessary to iteratively perform the calculation to find the optimal beamforming vector, so that only a one-shot calculation is needed to calculate the approximately optimal average sum rate.

Moreover, according to an embodiment of the present invention, as well as 2-cell system, it is possible to easily apply the present invention to a large the k-cell system.

Further, according to an embodiment of the present invention, in terms of the reduction of the sustainable calculated overload, the system for providing beamforming vector is suitable for a cellular network, in particular an ultra-high density cellular network.

DETAILED DESCRIPTION OF THE INVENTION

In the following, there are detailed descriptions that those skilled in the art would easily practice with reference to the accompanying drawings below. However, if it is determined that some detailed descriptions may unnecessarily obscure the subject matter by the detailed explanation about known functions and configurations, the detailed explanation thereof will be omitted regarding describing in detail the operating principle of a preferred embodiment of the present invention.

In addition, the same reference numbers refer to similar parts to the function and operation throughout the drawings. When any part of the specification that there is a connection to the other parts, it includes not only the case that is directly connected, but also the case that is indirectly connected. In addition, when what is described includes a certain component, it doesn't mean to exclude other components, but may contain other components, in general.

System for Providing Beamforming Vector

Figure 1:
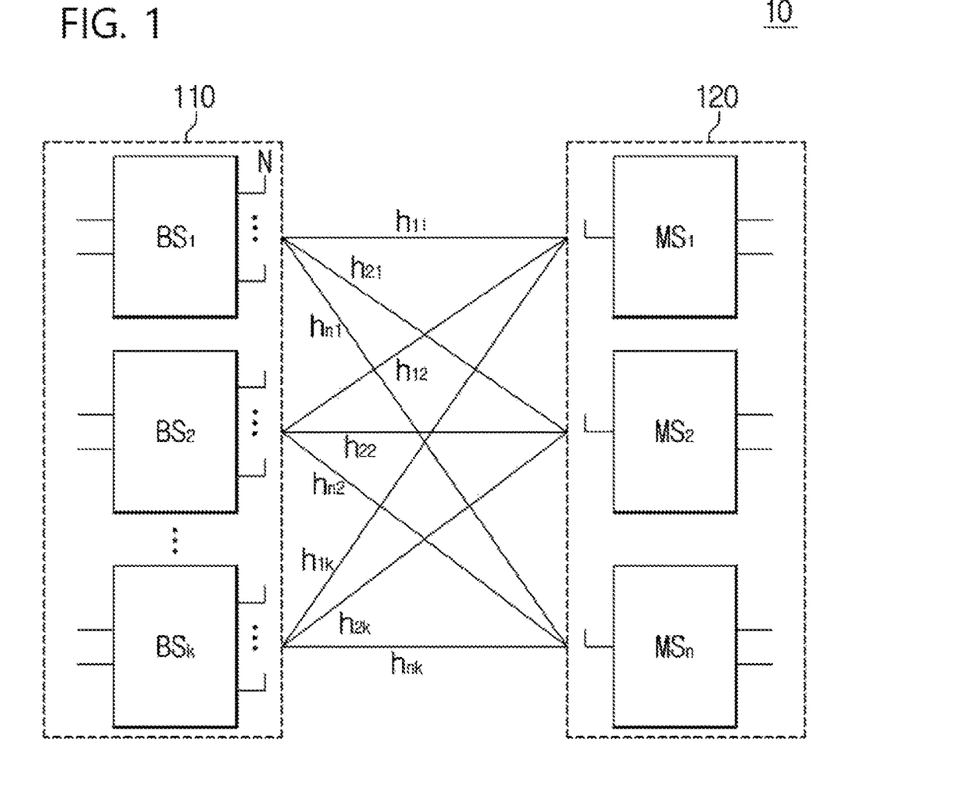
FIG. 1 is a view illustrating an example of a system for providing beamforming vector according to embodiment of the present invention.

FIG. 1 is a view illustrating an example of a system for providing a beamforming vector according to embodiment of the present invention. Specifically, FIG. 1 is a view illustrating an example of MISO interference channel systems. Though embodiment of the present invention is described considering MISO interference channel, this is to provide convenience of explanation and understanding for the present invention. Moreover, it is not to admit that the present invention does not include MIMO interference channel systems. Considering a usual technician in communication engineering, the present invention for MISO interference channel systems is applicable to MIMO interference channel systems. Referring to FIG. 1, the system for providing beamforming vectors 10 includes k base stations (BSs) and n mobile stations (MSs) associated with each BS.

FIG. 1 illustrates a system for providing beamforming vectors 10 (hereinafter "system" 10) comprising a transmitter 110 and a receiver 120. The transmitter 110 may include k base stations (BSs), and each base station (BS) may include Nt antennas (multiple antennas). The receiver 120 may include n mobile stations (MSs, also known as terminals). Each mobile station MS may have multiple antennas.

A first BS in the system transmits a signal to a first MS that is associated with the first BS. The first MS is influenced by interference signals of neighboring BSs when the neighboring BSs transmits signals to any MSs. According to an embodiment of the present invention, the system for providing beamforming vectors considers an MISO interference channel model as follows.

In the following explanations, the system 10 is modeled with k=2 and n=1. In other words, the system 10 includes two BSs inside transmitter 110 and one MS inside receiver 120 associated with each BS. Each BS includes Nt transmit antennas, and the MSs include at least a single receive antenna each. In other words, the system 10 is a downlink transmission 2-cell model wherein one user is served per cell.

Apparatus for Providing Beamforming Vector

Figure 2:
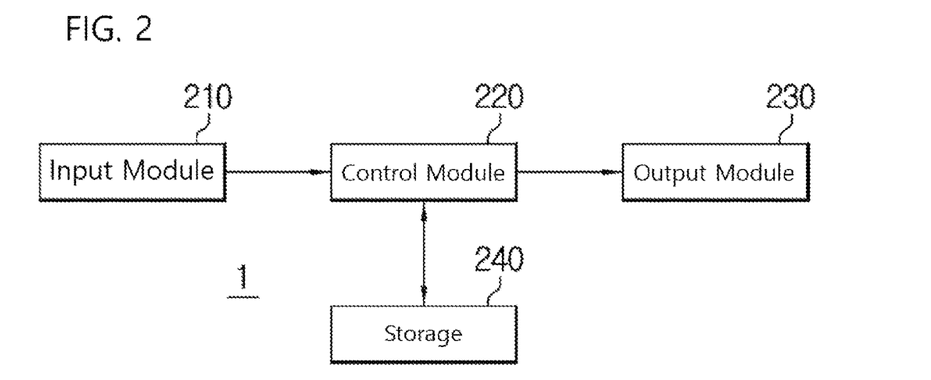
FIG. 2 is a view illustrating a block diagram of element of the apparatus for providing beamforming vector according to embodiment of the present invention.

FIG. 2 is a view illustrating a block diagram of an apparatus for providing beamforming vectors 1 (hereinafter "apparatus" 1) according to an embodiment of the present invention. Referring to FIG. 2, the apparatus 1 calculates beamforming vectors that maximize the sum rate by using probability for interference cancelations. The apparatus may be associated with a transmitter 110. The apparatus may include a personal computer with a transmitter 110 such as a computer desktop computer, laptop computer and handheld computer.

In addition, the apparatus 1 may include a high performance computer that is associated with a transmitter 110, such as a supercomputer or a large scale computer. The apparatus may include at least one input module 210, at least one control module 220, at least one output module 230 and at least one storage 240.

The input module 210 can receive channel state information for designing (calculating) a beamforming vector. The above channel state information can be local channel information.

The output module 230 can output designed beamforming vectors.

Therefore, the transmitter 110 can transmit signals to a receiver using an optimized beamforming vector that is designed at the apparatus.

At least one of information received by the input module 210, or beamforming design algorithms and variables can be stored at the storage 240. The storage 240 can store information that is inputted at the input module 210. Moreover, when the above information changes, the storage 240 can delete existing information and update new information.

The control module 220 is configured to perform the following steps. ① defining the probability (ψ) for an interference cancelation ② expressing a network-wide sum rate as a function of ψ ③ calculating the value of ψ that maximizes the network-wide sum rate ④ calculating a range of a magnitude of an interference channel to be canceled corresponding the value of ψ ⑤ designing for each BS, a beamforming vector that maximizes the network-wide sum rate. Each BS nullifies the range of the magnitude of the interference channel to be canceled.

In addition, each BS can be a transmitter or a transmitting end, and each MS can be a receiver or a receiving end.

Method for Providing Beamforming Vector

Figure 3:
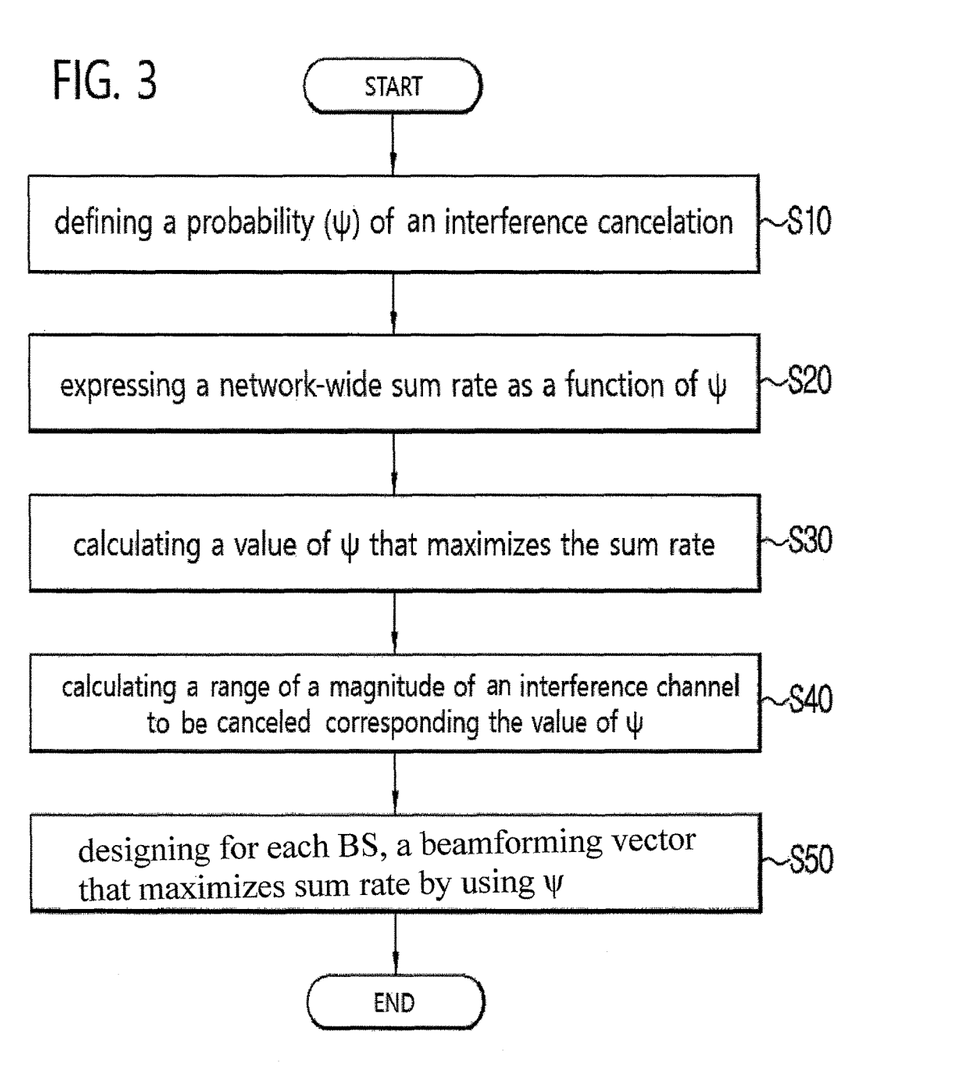
FIG. 3 a view illustrating a flow chart of the method for providing beamforming vector according to embodiment of the present invention.

FIG. 3 illustrates a flow chart of the method for providing beamforming vectors according to an embodiment of the present invention. Referring to FIG. 3, the method for providing beamforming vectors according to embodiment of the present invention includes the following stages. ① The control module 220 of the apparatus 1 defines a probability (ψ) for an interference cancelation (S10). ② The control module 220 expresses a network-wide sum rate as a function of ψ (S20). ③ The control module 220 calculates a value of ψ that maximizes the network-wide sum rate (S30). ④ The control module 220 calculates a range of a magnitude of an interference channel to be canceled corresponding the value of ψ (S40). ⑤ the control module 220 designs for each BS, a beamforming vector that maximizes the network wide sum rate (S50).

In conclusion, the proposed system, apparatus and method for providing beamforming vectors for wireless network systems aim to optimize network wide sum rate and design cooperative beamforming vectors by a one-shot (non-iterative) process. The detailed derivation is described in the following.

According to an embodiment of the present invention of the apparatus for providing beamforming vector, each BS can determine the beamforming vector by using a predetermined metric that we term a global selfishness. The global selfishness can be interpreted as the amount that each cell can behave selfishly or altruistically to maximize the network-wide sum rate.

In the followings, the boldface small letters denote vectors. "$\|\cdot\|$" denotes a norm, "$\Pr(\cdot)$" denotes a probability, and "$E(\cdot)$" denotes an expectation.

In a 2-cell cellular network model of downlink transmission according to the embodiment of the present invention, assume that each BS has $N_t$ transmit antennas and each MS has a single receive antenna. The received signal vector)), at the MS in the i-th cell can be expressed as Equation 1. This is to provide convenience of explanation and understanding for the present invention. Moreover, it is not to admit that the present invention does not include MIMO interference channel systems and is applicable to MIMO interference channel systems.

$$y_i = \sqrt{\rho_i}\, h_{ii} w_i x_i + \sqrt{\rho_{ji}}\, h_{ji} w_j x_j + n_i,$$
$$i, j \in \{1, 2\}, i \neq j$$

$$y_i = \sqrt{\rho_i}\, h_{ii} w_i x_i + \sum_{j=1}^{k} \sqrt{\rho_{ji}}\, h_{ji} w_j x_j + n_i,$$
$$i, j \in \{1, 2, \ldots, k\}, i \neq j$$

[Equation 1]

In the above Equation 1, $h_{ij}$ denotes $1 \times N_t$ channel vector between BS in the j-th cell and the MS in the i-th cell, $w_i$ denotes $N_t \times 1$ corresponding beamforming vector at the BS in the i-th cell. $x_i$ is the signal transmitted from the i-th BS to the i-th MS. The first equation in Equation 1 represents 2-cell cellular network and the second equation in Equation 1 represents k-cell cellular network. For providing convenience of explanation and understanding, it uses 2-cell cellular network in the followings.

It assumes that the elements of $h_{ij}$ follow independent and identically distributed complex Gaussian distribution with zero mean and unit variance. In addition, $n_i$ denotes the additive white Gaussian noise (AWGN) at the i-th MS with unit variance, pi denotes the average signal-to-noise ratio (SNR) of the MS in the i-th cell, and $\rho_{ij}$ is the average interference-to-noise ratio (INR) for the interference that the BS in the j-th cell causes to the MS in the i-th cell.

The received SINR(Signal-to-interference-plus-noise ratio) $\gamma_i$ of the MS in the i-th cell can be computed from Equation 1 as Equation 2.

$$\gamma_i = \frac{\rho_i |h_{ii} w_i|^2}{1 + \rho_{ji}|h_{ji} w_j|^2},\ i, j \in \{1, 2\}, i \neq j.$$ [Equation 2]

$$\gamma_i = \frac{\rho_i |h_{ii} w_i|^2}{1 + \sum_{j=1}^{k} \rho_{ji}|h_{ji} w_j|^2},\ i, j \in \{1, 2, \ldots, k\}, i \neq j.$$

The first equation in Equation 2 represents 2-cell cellular network and the second equation in Equation 2 represents k-cell cellular network. For providing convenience of calculation, considering 2-cell cellular network, the network-wide sum rate of all cells $R_i$ from Equation 2 is given as Equation 3.

$$R_i = \log_2(1 + \gamma_i)$$ [Equation 3]

And the network-wide sum rate of all k-cells is expressed as Equation 4.

$$R_{sum} = \sum_{j=1}^{k} R_j$$ [Equation 4]

k-cell cellular network model that includes 2-cell cellular network determines optimal $w_i$ to maximize $R_{sum}$. However, it is impossible to solve the sum rate maximization problem by mathematical process. Proposed alternate solutions include finding Pareto optimal (Non-Patent Document 5) and using Game-theory (Non-Patent Document 7). However, the conventional solutions in Non-Patent Document 5 and Non-Patent Document 7 consider only 2-cell cellular networks and it causes serious problems to solve sum rate maximization problems for k-cell cellular networks.

Therefore, to solve these problems, the embodiment of the present invention defines probability (ψ) for an interference cancelation by BS that can be network policy. In detail, ① defining the probability (ψ) for an interference cancelation ② expressing a network-wide sum rate as a function of ψ ③ calculating the value of ψ that maximizes the network-wide sum rate ④ calculating a range of a magnitude of an interference channel to be canceled corresponding the value of ψ ⑤ designing for each BS, a beamforming vector that maximizes the network-wide sum rate. Each BS nullifies the range of the magnitude of the interference channel to be canceled.

Specifically, considering problems Equation 1, 2, 3 and 4 in the embodiment of the present invention, it is described the system for providing beamforming vector according to embodiment of the present invention as the followings.

① Stage that Defines the Probability ($\psi$) for an Interference Cancelation (S10)

The system for providing beamforming vectors according to embodiment of the present invention includes using predetermined global selfishness that works in non-iterative manner and achieves near optimal sum rate performance.

The global selfishness ($\lambda$) can be interpreted as the amount that each cell can behave selfishly or altruistically to maximize the network-wide sum rate. The optimal value of the global selfishness ($\lambda$) is precomputed and shared as a network policy. Specifically, the i-th BS determines whether its interference links to neighboring cells are dominant or not by checking the channel gains of the interference links with $\lambda$. It can be expressed as Equation 5.

$$\Phi_i = \{j \mid \|h_{ij}\|^2 \geq \lambda\} \quad \text{[Equation 5]}$$

$\phi_i$ denotes the set of dominant interference links of the i-th BS. The beamforming vector is then computed to nullify the dominant interference links as Equation 6.

$$|h_{ij} w_i|^2 = 0, \forall j \in \Phi_i \quad \text{[Equation 6]}$$

When $\lambda$ is small, the entire network enters an altruistic mood where each cell tends to determine its cooperative beamforming vector that nullifies interference power to its neighboring cells. In the limit of $\lambda \to 0$ the proposed beamforming nullifies all the interference links, and becomes equivalent to the well-known ZF beamforming. The opposite is true for large $\lambda$, and the proposed beamforming becomes equivalent to the MRT beamforming in the limit of $\lambda \to \infty$.

There exist four possible cases depending on whether each BS acts in an egoistic or an altruistic way. Those cases and corresponding probabilities are tabulated in following Table 1.

TABLE 1

| Case # | BS$_1$ | BS$_2$ | Probability |
|---|---|---|---|
| Case 1 | Egoistic | Egoistic | $(1-\psi)^2$ |
| Case 2 | Egoistic | Altruistic | $(1-\psi)\psi$ |
| Case 3 | Altruistic | Egoistic | $\psi(1-\psi)$ |
| Case 4 | Altruistic | Altruistic | $\psi^2$ |

As tabulated in Table 1, cases and corresponding probability are defined as the above. Specifically, $\psi$ is defined as Equation 7.

$$\psi = Pr(\|h_{ji}\|^2 > \lambda) \quad \text{[Equation 7]}$$

Case 1 implies that all BSs operate selfishly where no BS nullifies interference links. In the case 2 and case 3, one BS nullifies its generated interference link, and the other BS operates selfishly. Case 4 implies that all BSs nullify the generated interference link and all MSs whose received interference link are nullified.

② Stage that Expresses a Network-Wide Sum Rate as a Function of $\psi$ (S20)

SINR of the MS in the i-th cell can be defined as random variable $\Gamma_i^{(m,l)}$ where the i-th BS nullifies m generated interference links to neighboring cells and l received interference links of the MS in the i-th cell are nullified by the neighboring BSs $\Gamma_i^{(m,l)}$ can be expressed as the following Equation 8.

$$\Gamma_i^{(m,l)} = \frac{\rho_i \chi_{2(N_t-m)}^2}{1 + \rho_{ji}(1-l)\beta(1, N_t-1)}, \quad \text{[Equation 8]}$$

$$m, l \in \{0, 1\}$$

In the above Equation 8, denotes the Chi-square distribution random variable with n degrees of freedom. The numerator of Equation 8 can be followed from lemma 2 of Non-Patent Document 10. The denominator of Equation 8 can be derived as Beta-distribution random variables since $h_{ji}$ and $w_j$ are independent and isotopically distributed in the $N_t$-dimensional complex domain, and thus the product of them can be expressed by a well-known Beta-distribution function. Since l received interference links of the MS are nullified by the neighboring BSs, the denominator of Equation 8 can be expressed as above. Considering the four possible cases, $R_{sum}(\psi)$ can be derived as the following Equation 9 by using Equation 4 and Equation 8.

$$R_{sum}(\psi) = (1-\psi)^2 \log_2((1+\Gamma_1^{(0,0)})(1+\Gamma_2^{(0,0)}) + \quad \text{[Equation 9]}$$
$$\psi(1-\psi)\log_2((1+\Gamma_1^{(0,1)})(1+\Gamma_2^{(1,0)}) +$$
$$\psi(1-\psi)\log_2((1+\Gamma_1^{(1,0)})(1+\Gamma_2^{(0,1)}) +$$
$$\psi^2 \log_2((1+\Gamma_1^{(1,1)})(1+\Gamma_2^{(1,1)}))$$

For sum rate analysis, the expected sum rate and its upper bound are derived in following Equation 10. The upper bound of the expected sum rate is expressed as $R_{sum}^U(\psi)$.

$$E[R_{sum}(\psi)] = (1-\psi)^2 E[\log_2(1+\Gamma_1^{(0,0)})(1+\Gamma_2^{(0,0)})] + \quad \text{[equation 10]}$$
$$\psi(1-\psi)E[\log_2(1+\Gamma_1^{(0,1)})(1+\Gamma_2^{(1,0)})] +$$
$$\psi(1-\psi)E[\log_2(1+\Gamma_1^{(1,0)})(1+\Gamma_2^{(0,1)})] +$$
$$\psi^2 E[\log_2(1+\Gamma_1^{(1,1)})(1+\Gamma_2^{(1,1)})] \leq$$
$$(1-\psi)^2 \log_2(E[1+\Gamma_1^{(0,0)}]E[1+\Gamma_2^{(0,0)}]) +$$
$$\psi(1-\psi)\log_2(E[1+\Gamma_1^{(0,1)}]E[1+\Gamma_2^{(1,0)}]) +$$
$$\psi(1-\psi)\log_2(E[1+\Gamma_1^{(1,0)}]E[1+\Gamma_2^{(0,1)}]) +$$
$$\psi^2 \log_2(E[1+\Gamma_1^{(1,1)}]E[1+\Gamma_2^{(1,1)}]) \equiv R_{sum}^U(\psi)$$

The inequality in the above Equation 10 follows from Jensen's inequality. $R_{sum}^U(\psi)$ can be expressed as the following Equation 11 by using Equation 10.

$$R_{sum}^U(\psi) \approx A\psi^2 + B\psi + C \quad \text{[Equation 11]}$$

Considering the above Equation 11, $\psi^*$ that maximizes $R_{sum}^U(\psi)$ can be determined.

③ Stage that Calculates a Value of $\psi$ that Maximizes the Network-Wide Sum Rate (S30)

Optimal probability $\psi^*$ maximizes $R_{sum}^U(\psi)$ and it can be expressed as $\psi^* = \arg\max R_{sum}^U(\psi)$. Note that $R_{sum}^U(\psi)$ is a quadratic function of $\psi$. First consider that $R_{sum}^U(\psi)$ is a concave function (A<0). The point of pole $\psi^D$ becomes the optimal point of $\psi$ if $\psi^D$ is located in [0,1]. If $\psi^D$ is less than 0 or greater than 1, the optimal value of $\psi^*$ is 0 or 1, respectively. Then, consider that $R_{sum}^U(\psi)$ is a convex function (A>0). Either 0 or 1 that is closer to $\psi^D$ becomes $\psi^*$. In short, $\psi^*$ is determined as the following Equation 12.

[Equation 12]

(1) $A < 0$ $$\psi^* = \begin{pmatrix} 0 & \text{if} & \psi^D < 0 \\ \psi^D & \text{if} & 0 \leq \psi^D \leq 1 \\ 1 & \text{if} & 1 < \psi^D \end{pmatrix}$$

(2) $A > 0$ $$\psi^* = \begin{pmatrix} 0 & \text{if} & |\psi^D| \leq |\psi^D - 1| \\ 1 & \text{if} & |\psi^D| > |\psi^D - 1| \end{pmatrix}$$

where, $$\psi^D = -B/2A, \text{ s.t. } \left[\frac{\partial R^U_{sum}(\psi)}{\partial \psi}\right]_{\psi=\psi^D} = 0$$

④ Stage Calculates a Range of a Magnitude of an Interference Channel to be Canceled Corresponding the Value of ψ (S40)

Furthermore, the optimal value of λ (λ) can be determined since $\|h_{ji}\|^2$ has a Gamma ($N_t$, 1) distribution and there is one-to-one correspondence between ψ and λ. Thus, λ* can be uniquely determined with ψ*.

⑤ Stage that Nullifies the Range of the Magnitude of the Interference Channel to be Canceled (S50)

As optimal value λ* is determined, each BS can simply optimize the network-wide sum rate by having each BS nullify the interference channels whose magnitude are larger than λ*. Each BS can design a beamforming vector that maximizes sum rate by using ψ. It will be verified in the numerical results as below.

According to embodiment of the present invention, the principal advantage of the proposed system for providing beamforming vector is that it requires much less computational complexity; it only requires a simple comparison of a channel with the given λ*. Since the computational complexity of scheme mainly comes from computations of the precoding vectors, we compare the computational complexity in terms of the required number of computations for precoding vectors. The proposed system for providing beamforming vector requires only a single computation of precoding vector. In contrast, the previous iterative systems for providing beamforming vector require dozens of computations for precoding vectors, for example, the iterative systems for providing beamforming vectors in Non-Patent Document 5 requires about 30 repeats of precoding vector computations.

Numerical Results of the Embodiment of the Present Invention

According to the system for providing beamforming vector of the embodiment of the present invention, the followings describes the numerical data of the embodiment of the present invention. It helps to understand clearly and verify the performance of the system for providing beamforming for a usual technician, it does not limit the scope of the embodiment of the present invention. The numerical data of the embodiment of the present invention assumes that 2-cell cellular networks with Nt=2 and Nr=1. The pathloss exponent is set to 3.7 in the simulations.

Figure 4:
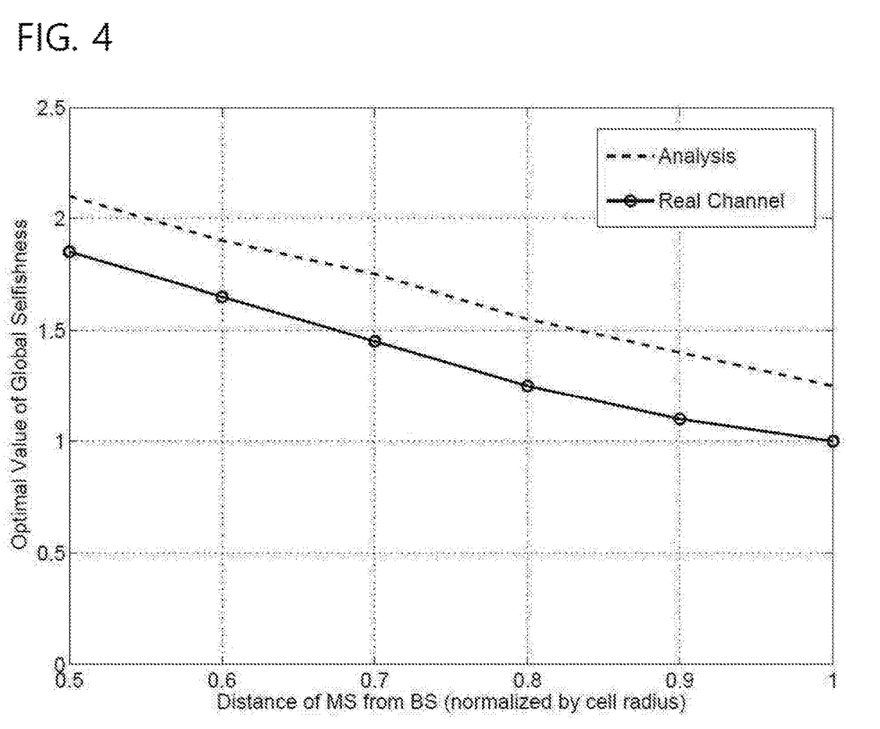
FIG. 4 illustrates how the optimal global selfishness $\lambda^*$ varies with the distance of a MS from a BS according to an exemplary embodiment of the present invention.

FIG. 4 illustrates how the optimal global selfishness λ* varies with the distance of a MS from a BS according to an exemplary embodiment of the present invention. The SNR is set to 20 dB in the simulations. MS1 is uniformly located in 0.5R and R area and MS2 is located from 0.5R to R, where R denotes the cell radius. The dashed line denotes the optimal global selfishness computed from the average sum rate approximation in while the solid line denotes one searched from average sum rate observations with real channel realizations. Despite a slight overestimation of λ*, our analysis provides a computationally efficient way to determine λ*. When a MS is located near a BS, the optimal value of the global selfishness becomes high, which implies that each cell may behave selfishly, maximizing its own desired signal power. As a MS moves toward the cell edge, the optimal value of the global selfishness gradually decreases. Each cell should behave altruistically, suppressing the generated interference power to neighboring cells.

Figure 5:
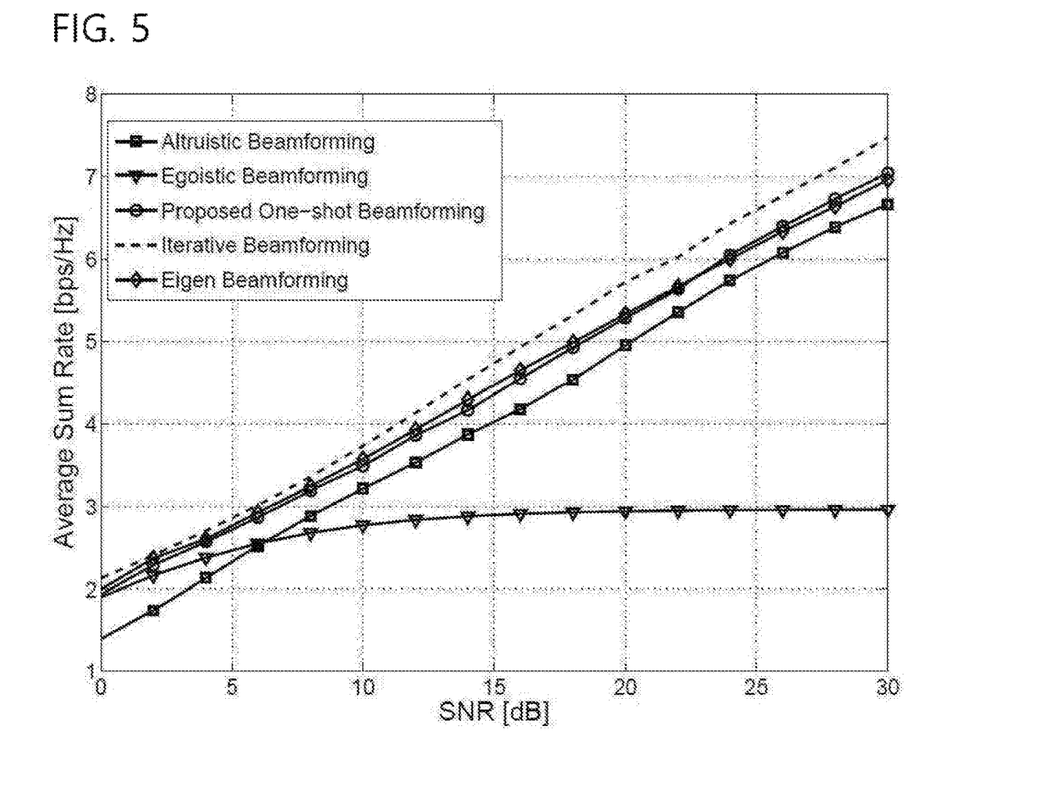
FIG. 5 illustrates sum rate performance compared to conventional beamforming in 2-cell cellular system according to an exemplary embodiment of the present invention.

FIG. 5 illustrates sum rate performance compared to conventional beamforming in a 2-cell cellular system according to an exemplary embodiment of the present invention. In FIG. 5, the numerical data of the embodiment of the present invention is compared to two non-iterative schemes, egoistic beamforming (MRT) and altruistic beamforming (ZF), SGINR based Eigen beamforming and one iterative scheme Non-Patent Document 5. The MSs are located in between 0.5R and R. As shown in FIG. 5, the numerical data of the embodiment of the present invention outperforms both altruistic and egoistic beamforming in all SNR values. This is because the proposed beamforming system attempts to balance the egoism and altruism with the help of the decision metric, i.e., global selfishness. As compared to SGINR based Eigen beamforming, the proposed beamforming system performs as V-SINR based Eigen beamforming approximately. The performance of the proposed beamforming system achieves 93% of the iterative Pareto optimal beamforming performance. Specifically, the iterative beamforming requires about 40 iterations for providing beamforming vector. Moreover, the proposed beamforming system offers substantial reduction in computational burden and it is applicable high density small cellular network systems.

Figure 6:
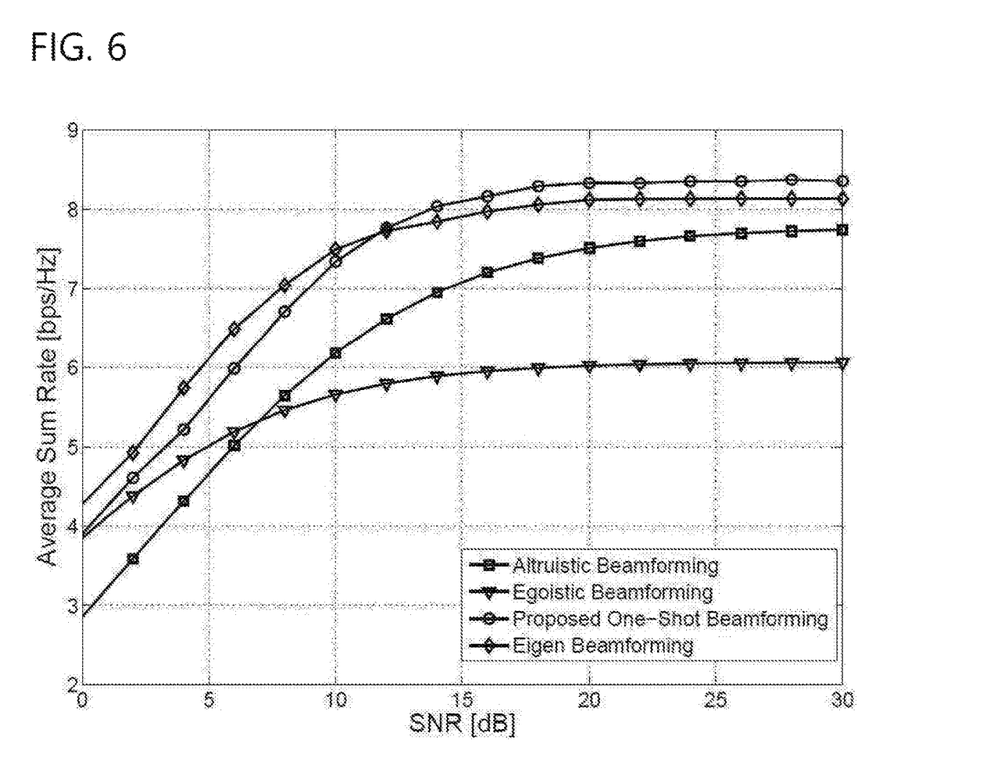
FIG. 6 illustrates sum rate performance compared to conventional beamforming in 3-cell cellular system according to an exemplary embodiment of the present invention.

FIG. 6 illustrates sum rate performance compared to conventional beamforming in 3-cell cellular system according to an exemplary embodiment of the present invention. As illustrated in FIG. 6, the average sum rate performance of the embodiment of the present invention can be compared to those of the conventional beamforming systems in 3-cell cellular network systems. In FIG. 6, the average sum rate performance of the embodiment of the present invention is compared to two non-iterative schemes, egoistic beamforming (MRT) and altruistic beamforming (ZF) and SGINR based Eigen beamforming. The Pareto iterative beamforming systems is applicable for only 2-cell cellular network, therefore, it is excluded in FIG. 6. As shown in FIG. 6, the average sum rate performance of SGINR based beamforming outperforms other beamformings in low interference regions. However, the average sum rate performance of the embodiment of the present invention outperforms other beamformings in high interference region where SNR is larger than 12 dB.

The SGINR based Eigen beamforming requires some assumptions, e.g., high SINR, to be valid for general M>2 network scenarios while the proposed beamforming system can be analytically derived for any M>2 network scenarios by focusing on the average sum rate metric. In this sense, the performance improvement of the proposed beamforming system over the SGINR based Eigen beamforming becomes larger in cell edges as shown in FIG. 6. This makes the embodiment of the present invention more appropriate for practical cellular applications.

Computer Program and Recording Media for Providing Beamforming Vector

Computer program for providing beamforming vector according to embodiment of the present invention can be implemented in computer system by using the above described stages. Recording media can be read by a computer for providing beamforming vector according to embodiment of the present invention can be USB and CD, etc. that record the computer program for providing beamforming vector according to embodiment of the present invention.

As described above, the skilled person in the art will appreciate that the present invention can be embodied in other specific forms without changing the technical idea or essential features. Therefore, the above-described embodiments will be illustrative in all respects should be understood as not limiting it.

The scope of the invention is indicated by the claims rather than the detailed description. All such modifications that are derived from the meaning and scope of the claims and equivalent concepts form should be construed as included in the scope of the invention.

DESCRIPTION OF REFERENCE NUMERALS

1: the apparatus for providing beamforming vector
10: the system for providing beamforming vector
110: a transmitter
120: a receiver
210: an input module
220: a control module
230: an output module
240: a storage

What we claim is:

1. A system for providing a beamforming vector, the system comprising:
   a transmitter associated with a plurality of cells and including at least one apparatus calculating beamforming vectors, wherein the apparatus controls a signal transmission of each of the plurality of cells;
   wherein the apparatus defines a probability ($\psi$) for an interference cancellation, expresses a network-wide sum rate as a function of $\psi$, calculates a value of $\psi$ that maximizes the network-wide sum rate, calculates a range of a magnitude of an interference channel to be cancelled corresponding the value of $\psi$, and designs for at least one Base Station (BS) a beamforming vector that maximizes the network-wide sum rate by using the value of $\psi$, and
   a receiver receiving a signal from the transmitter using the beam forming vector and comprising at least one mobile station.

2. The system of claim 1, wherein the network-wide sum rate is derived by following equation:

$$E[R_{sum}(\psi)] = (1-\psi)^2 E[\log_2(1+\Gamma_1^{(0,0)})(1+\Gamma_2^{(0,0)})] + $$
$$\psi(1-\psi)E[\log_2(1+\Gamma_1^{(0,1)})(1+\Gamma_2^{(1,0)})] + $$
$$\psi(1-\psi)E[\log_2(1+\Gamma_1^{(1,0)})(1+\Gamma_2^{(0,1)})] + $$
$$\psi^2 E[\log_2(1+\Gamma_1^{(1,1)})(1+\Gamma_2^{(1,1)})] \leq $$
$$(1-\psi)^2\log_2(E[1+\Gamma_1^{(0,0)}]E[1+\Gamma_2^{(0,0)}]) + $$
$$\psi(1-\psi)\log_2(E[1+\Gamma_1^{(0,1)}]E[1+\Gamma_2^{(1,0)}]) + $$
$$(1-\psi)\log_2(E[1+\Gamma_1^{(1,0)}]E[1+\Gamma_2^{(0,1)}]) + $$
$$\psi^2\log_2(E[1+\Gamma_1^{(1,1)}]E[1+\Gamma_2^{(1,1)}]) \equiv R_{sum}^U(\psi),$$

where $E(\cdot)$ is a function for an expected value, $R_{sum}(\psi)$ is the network-wide sum rate, $R_{sum}^U(\psi)$ is an upper bound of an expected value of the network-wide sum rate and $\Gamma_i^{(m,l)}$ is a Signal-to-Interference-plus-Noise-Ratio (SINR) of a mobile station (MS) in an i-th cell, where an i-th base station (BS) nullifies m generated interference links to neighboring cells and/received interference links of the MS in the i-th cell are nullified by neighboring BSs.

3. The system of claim 1, wherein the value of $\psi$ that maximizes the network-wide sum rate is derived by following equation:

(1) $A < 0$ [Equation]

$$\psi^* = \begin{pmatrix} 0 & \text{if} & \psi^D < 0 \\ \psi^D & \text{if} & 0 \leq \psi^D \leq 1 \\ 1 & \text{if} & 1 < \psi \end{pmatrix}$$

(2) $A > 0$ $$\psi^* = \begin{pmatrix} 0 & \text{if} & |\psi^D| \leq |\psi^D - 1| \\ 1 & \text{if} & |\psi^D| > |\psi^D - 1| \end{pmatrix}$$

where, $$\psi^D = -B/2A, \text{ s.t. } \left[\frac{\partial R_{sum}^U(\psi)}{\partial \psi}\right]_{\psi=\psi^D} = 0,$$

$$R_{sum}^U(\psi) \approx A\psi^2 + B\psi + C,$$

where $R_{sum}(\psi)$ the network-wide sum rate, $R_{sum}^U(\psi)$ is an upper bound of an expected value of the network-wide sum rate, $\psi$ is at least one optimal value of probability $\psi$, $\psi^D$ is a point of at least one pole, A, B and C are coefficients determined by a power of the apparatus for providing the beamforming vector and a location of at least one receiver.

4. A computer readable non-transitory storage medium including instructions that, when executed by one or more processors, perform the following steps:
   define a probability ($\psi$) for an interference cancellation,
   express a network-wide sum rate as a function of $\psi$,
   calculate a value of $\psi$ that maximizes the network-wide sum rate,
   calculate a range of a magnitude of an interference channel to be canceled corresponding the value of $\psi$, and
   design for at least one base station (BS) a beamforming vector that maximizes the network-wide sum rate by using the value of $\psi$, and
   instruct the at least one base station (BS) to transmit a signal using the beamforming vector.

* * * * *